United States Patent
Roskind et al.

(10) Patent No.: US 9,984,174 B2
(45) Date of Patent: May 29, 2018

(54) SPECULATIVE ACTIONS BASED ON USER DWELL TIME OVER SELECTABLE CONTENT

(71) Applicant: Google Inc., Mountain View, CA (US)

(72) Inventors: James Roskind, Redwood City, CA (US); Jake Brutlag, Mountain View, CA (US)

(73) Assignee: Google LLC, Mountain View, CA (US)

( * ) Notice: Subject to any disclaimer, the term of this patent is extended or adjusted under 35 U.S.C. 154(b) by 521 days.

(21) Appl. No.: 14/448,383

(22) Filed: Jul. 31, 2014

(65) Prior Publication Data
US 2016/0188745 A1    Jun. 30, 2016

Related U.S. Application Data

(63) Continuation of application No. 13/252,912, filed on Oct. 4, 2011, now Pat. No. 8,826,153.

(51) Int. Cl.
*G06F 3/0484* (2013.01)
*G06F 17/30* (2006.01)

(52) U.S. Cl.
CPC .... *G06F 17/30899* (2013.01); *G06F 3/04842* (2013.01); *G06F 17/30902* (2013.01)

(58) Field of Classification Search
CPC .................................................. G06F 3/04842
USPC .......................................................... 715/760
See application file for complete search history.

(56) References Cited

U.S. PATENT DOCUMENTS

| | | | | |
|---|---|---|---|---|
| 6,055,569 A * | 4/2000 | O'Brien | ............ | G06F 17/30902 707/E17.12 |
| 6,338,066 B1 * | 1/2002 | Martin | ................ | G06F 17/3089 707/708 |
| 6,584,498 B2 * | 6/2003 | Nguyen | ............ | G06F 17/30902 707/E17.12 |
| 6,742,033 B1 * | 5/2004 | Smith | ............... | G06F 17/30902 707/E17.12 |
| 7,003,566 B2 * | 2/2006 | Codella | ............ | G06F 17/30902 707/E17.12 |
| 7,103,852 B2 * | 9/2006 | Kairis, Jr. | ............. | G06F 3/0418 345/173 |
| 7,558,822 B2 * | 7/2009 | Fredricksen | ...... | G06F 17/30873 709/203 |

(Continued)

OTHER PUBLICATIONS

Markham, Gervase, "Hacking for Christ: Mouseover Frefetch?" available at <http://blog.gerv.net/2009/05/mouseover_prefetch/>, Jun. 20, 2009, 11 pages.*

(Continued)

*Primary Examiner* — Reza Nabi
(74) *Attorney, Agent, or Firm* — Lerner, David, Littenberg, Krumholz & Mentlik, LLP

(57) ABSTRACT

Methods, systems, and techniques for reducing web page load time are provided. An exemplary method for reducing web page load time includes detecting, in a browser, a cursor in a region of a web page. The region surrounds a selectable item associated with a URL. The exemplary method includes determining whether the cursor is present in the region for a threshold period of time. The exemplary method further includes performing a speculative action when it is determined that the cursor has been present in the region for the threshold period of time, without modifying underlying code of a web page associated with the URL.

20 Claims, 6 Drawing Sheets

(56) References Cited

U.S. PATENT DOCUMENTS

| | | | | |
|---|---|---|---|---|
| 7,653,883 B2* | 1/2010 | Hotelling | G06F 3/0485 | 715/863 |
| 7,693,816 B2* | 4/2010 | Nemoto | G06F 17/30457 | 707/781 |
| 7,747,749 B1* | 6/2010 | Erikson | G06F 17/30902 | 709/219 |
| 7,890,850 B1* | 2/2011 | Bryar | G06F 17/30905 | 715/200 |
| 7,949,960 B2* | 5/2011 | Roessler | G06F 9/4443 | 715/745 |
| 2004/0123135 A1* | 6/2004 | Goddard | H04N 7/163 | 726/27 |
| 2005/0028191 A1* | 2/2005 | Sullivan | H04N 5/4401 | 725/28 |
| 2006/0047804 A1* | 3/2006 | Fredricksen | G06F 17/30873 | 709/224 |
| 2006/0129191 A1* | 6/2006 | Sullivan | A61N 1/39 | 607/5 |
| 2006/0294223 A1* | 12/2006 | Glasgow | H04L 67/2847 | 709/224 |
| 2007/0078822 A1* | 4/2007 | Cucerzan | G06F 17/30864 | |
| 2008/0005672 A1* | 1/2008 | Mestres | G06F 17/30902 | 715/700 |
| 2008/0066052 A1* | 3/2008 | Wolfram | G06F 8/30 | 717/109 |
| 2008/0195474 A1* | 8/2008 | Lau | G06F 17/30035 | 705/14.73 |
| 2009/0094187 A1* | 4/2009 | Miyaki | G06F 21/6218 | |
| 2009/0248593 A1* | 10/2009 | Putzolu | A63F 13/10 | 706/10 |
| 2010/0016910 A1* | 1/2010 | Sullivan | A61N 1/39 | 607/5 |
| 2010/0031183 A1* | 2/2010 | Kang | G06F 17/30902 | 715/772 |
| 2010/0049872 A1* | 2/2010 | Roskind | G06F 17/30902 | 709/245 |
| 2010/0088304 A1* | 4/2010 | Jackson | G06F 17/30899 | 707/706 |
| 2010/0088398 A1* | 4/2010 | Plamondon | H04L 67/28 | 709/220 |
| 2010/0312858 A1* | 12/2010 | Mickens | G06F 17/30902 | 709/219 |
| 2010/0321871 A1* | 12/2010 | Diebel | G06F 1/1628 | 361/679.01 |
| 2010/0328112 A1* | 12/2010 | Liu | G06F 3/0233 | 341/24 |
| 2011/0029641 A1* | 2/2011 | Fainberg | G06F 17/30902 | 709/219 |
| 2011/0090085 A1* | 4/2011 | Belz | G08B 21/0423 | 340/573.1 |
| 2011/0125372 A1* | 5/2011 | Ito | B60R 21/0132 | 701/45 |

OTHER PUBLICATIONS

Markham, Gervase, "Hacking for Christ: Mouseover Frefetch?" available at <http://blog.gerv.net/2009/05/mouseover_prefetch/>, Jun. 20, 2009, 11 pages.*

Examination Report dated Sep. 2, 2016, for European Patent Application No. 12187322.8.

Cybernetnews. "CyberNotes: Cooliris Provides Faster, Easier Way to Browse the Web." Aug. 31, 2011. 11 pages. http://cybernetnews.com/cybernotes-cooliris-provides-faster-easier-way-to- -browse-the-web/.

Markham, Gervase, "Hacking for Christ: Mouseover Frefetch?" available at <http://blog.gerv.net/2009/05/mouseover.sub.--prefetch/>, Jun. 20, 2009, 11 pages.

O'Reilly, Dennis. "Four productivity-boosting Firefox extensions." Jan. 25, 2008. 7 pages. http://news.cnet.com/8301-13880.sub.--3-9857991-68.html.

European Search Report dated Mar. 19, 2013 for Application No. EP12187322.

Summons to Attend Oral Proceedings for European Patent Application No. 12187322.8, dated Jul. 25, 2017. 8 pages.

* cited by examiner

US 9,984,174 B2

SPECULATIVE ACTIONS BASED ON USER DWELL TIME OVER SELECTABLE CONTENT

CROSS-REFERENCE TO RELATED APPLICATIONS

The present application is a continuation of U.S. patent application Ser. No. 13/252,912, filed Oct. 4, 2011, the disclosure of which is incorporated herein by reference.

BACKGROUND

A client sends a request to a server for a web page. The server sends the requested web page to the client to display. The user may navigate to a different web page or a different location within the web page by selecting a link in the web page. It typically takes the user some time, for example 200 milliseconds, to focus in on a link and then select it. This may be for a variety of reasons. For example, it may take a user time to position and focus the cursor over the selectable item to select it. This may depend on such factors as a user's hand-eye coordination or experience controlling the user interface cursor. Also, a user may be indecisive and take a moment to decide whether to select the item.

BRIEF SUMMARY

An exemplary method for reducing web page load time includes detecting, in a browser, a cursor in a region of a web page, the region surrounding a selectable item associated with a uniform resource locator (URL). The exemplary method may also include determining whether the cursor is present in the region for a threshold period of time. The exemplary method may further include performing a speculative action when it is determined that the cursor has been present in the region for the threshold period of time, without modifying underlying code of a web page associated with the URL.

Another exemplary method includes detecting, by a touch screen device, an object within a proximity above a region of the touch screen device, the region surrounding a selectable item associated with a URL displayed on a web page. The exemplary method may also include determining whether the object is located within the proximity above the region of the touch screen device for a threshold period of time. The exemplary method may further include performing a speculative action when it is determined that the object has been located within the proximity above the region for the threshold period of time, without modifying underlying code of a web page associated with the URL.

Other embodiments include corresponding systems, apparatuses, and computer program products configured to perform the actions of these methods, encoded on computer storage devices.

Further embodiments, features, and advantages, as well as the structure and operation of the various embodiments are described in detail below with reference to accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENT(S)

Figure 1:
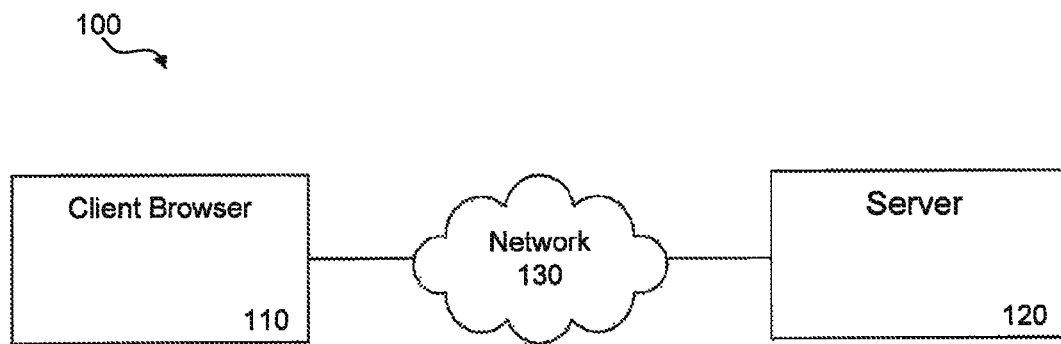
FIG. 1 shows an illustration of an exemplary communication system in which embodiments can be implemented, according to an embodiment.

I. Overview
II. Exemplary System Architecture
III. Exemplary Client Browser
A. Selecting an Item with a Cursor
B. Selecting an Item via a Touch Screen Device
C. Other Example Embodiments
IV. Threshold Period of Time
V. Exemplary Methods
VI. Conclusion

I. Overview

This description generally relates to network communication. A client browser may display a web page that contains items (e.g., links) selectable by a user. It can take at least 200-400 milliseconds for a user to, for example, place a cursor over the selectable item and "click" on it. During this delay, an application may speculate and take actions on behalf of the user that reduce observed latency.

Some user actions may indicate a high probability that the user will select a particular item in the web page in the near future. For example, a cursor lingering near a selectable item for a threshold period of time may indicate a high likelihood that the user will select the item in the near future. User-perceived latency may be reduced between a user's selection of the selectable item and the display of content that is referenced by the selectable item by performing a speculative action that includes at least part of an action that would ensue if the selection were completed.

In an embodiment, an object (e.g., cursor) may be detected in a region of a web page. The region may surround a selectable item associated with a URL. When it is determined that the object is present in the region for a threshold period of time, a speculative action is performed. In another embodiment, an object (e.g., stylus) may be detected within a proximity above a region of a touch screen device. The region may surround a selectable item associated with a URL that is displayed on a web page. When it is determined that the object is located within a proximity above the region for a threshold period of time, a speculative action is performed.

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the present disclosure is described herein with reference to embodiments for particular applications, it should be understood that the disclosure is not limited thereto. Those skilled in the art with access to the teachings provided herein will recognize additional modifications, applications, and embodiments within the scope thereof and additional fields in which the disclosure would be of significant utility.

II. Exemplary System Architecture

FIG. 1 shows an illustration of an exemplary communication system 100 in which embodiments can be implemented, according to an embodiment. System 100 includes a client browser 110 that is communicatively coupled to a server 120 via a network 130. Although system 100 is described herein with reference to one client browser and one server, one of skill in the art will recognize that system 100 may also include more than one client browser and more than one server.

Web browsers are software applications that allow a user to view or download content that is available on a network, such as on a website on the World Wide Web. Content may include, for example and without limitation, text, files, images, audio, video and personal communications. Web pages present such content and are located using uniform resource identifiers (URI) such as a uniform resource locator (URL). Web pages may be retrieved using the Internet Protocol (IP) address of the computer holding the web page content.

Browsers may use a number of protocols and standards to obtain or manage content flow. Many browsers use hypertext transfer protocol (HTTP) to fetch content and web pages. HTTP is an application-level protocol providing basic request/response semantics. HTTP can be used for requesting and retrieving objects from a server.

Server 120 can be, for example and without limitation, a telecommunications server, a web server, or other type of database server that supports web protocols such as HTTP. A web server may contain web applications which generate content in response to an HTTP request. The web server may package the generated content and serve the content to a client in the form of an HTTP response. A web server may be a software component that responds to an HTTP request with an HTTP reply. As illustrative examples, the web server may be, without limitation, Apache HTTP Server, Apache Tomcat, Microsoft Internet Information Server, JBoss Application Server, WebLogic Application Server, or Sun Java System Web Server. The web server may serve content such as hypertext markup language (HTML), extendable markup language (XML), documents, videos, images, multimedia features, or any combination thereof. This example is strictly illustrative and does not limit the scope of the present disclosure.

Client browser 110 can run on any computing device. Similarly, server 120 can be implemented using any computing device capable of serving data to the client. Examples of computing devices include, but are not limited to, a central processing unit, an application-specific integrated circuit, a computer, workstation, distributed computing system, computer cluster, embedded system, stand-alone electronic device, networked device, mobile device (e.g. mobile phone, smart phone, personal digital assistant (PDA), navigation device, tablet or mobile computing device), rack server, set-top box, or other type of computer system having at least one processor and memory. A computing process performed by a clustered computing environment or server farm may be carried out across multiple processors located at the same or different locations. Such a computing device may include software, firmware, hardware, or a combination thereof. Software may include one or more applications and an operating system. Hardware can include, but is not limited to, a processor, memory and user interface display.

Network 130 can be any network or combination of networks that can carry data communication, and may be referred to herein as a computer network. Such network 140 can include, but is not limited to, a wired (e.g., Ethernet) or a wireless (e.g., Wi-Fi and 3G) network, a local area network, medium area network, and/or wide area network such as the Internet. Network 140 can support protocols and technology including, but not limited to, World Wide Web protocols and/or services. Intermediate web servers, gateways, or other servers may be provided between components of system 100 depending upon a particular application or environment.

III. Exemplary Client Browser

Figure 2:
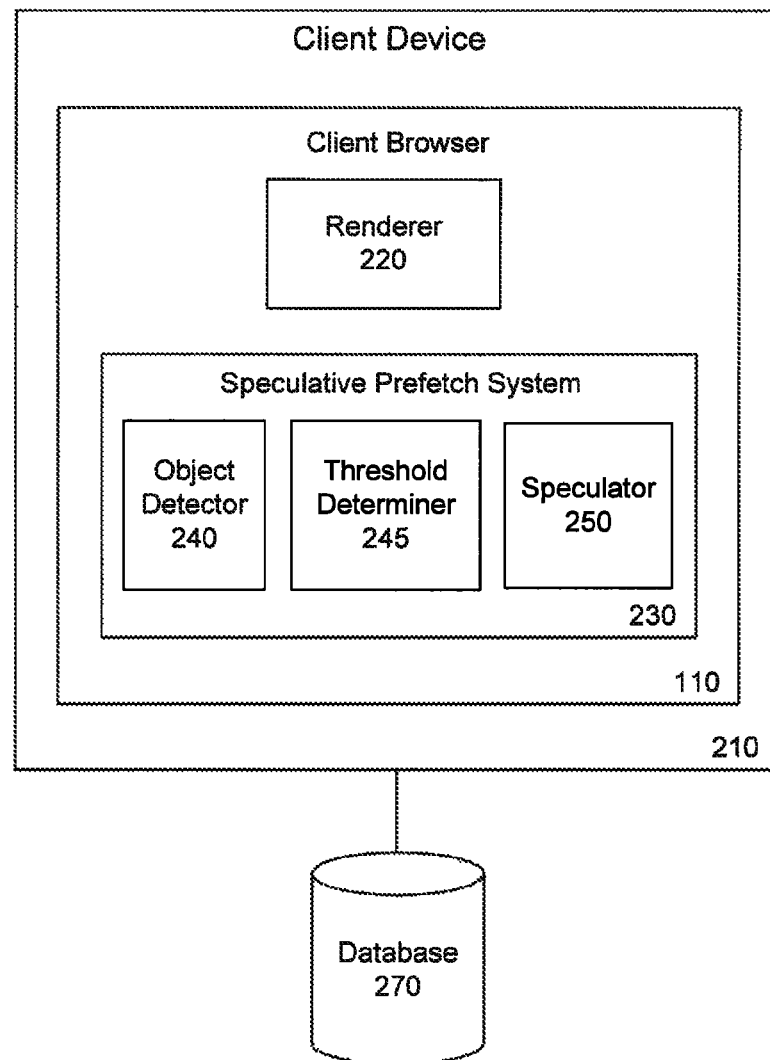
FIG. 2 shows a block diagram of an exemplary computer system, according to an embodiment.

FIG. 2 shows a block diagram of an exemplary computer system 200, according to an embodiment. System 200 includes client device 210, which can communicate over network 130.

Client device 210 includes client browser 110. Client browser 110 may retrieve web pages through a series of requests to and responses from a server. In one example, client browser 110 sends a request to server 120, such as for a web page, over network 130. Server 120 receives the request and returns a response such as content for the requested web page.

Client browser 110 includes a renderer 220. Renderer 220 displays content associated with the web page. In one example, when a user requests a web page, renderer 220 can render the web page on-screen. The web page may include items that are selectable by a user. An example of a selectable item in a web page is a hyperlink. A hyperlink may be a word, group of words, or an image that a user can select to navigate to a new document or a different section within the current document. A selectable item can reference a document or specific content in a document. Examples of documents are HTML documents and XHTML documents. These examples are not intended to be limiting.

Client browser 110 also includes a speculative prefetch system 230. Speculative prefetch system 230 includes an object detector 240, a threshold determiner 245, and a speculator 250. Speculative prefetch system 230 may be a browser plug-in that adds functionality to client browser 110 or may be native to client browser 110. In an embodiment, speculative prefetch system 230 may be implemented within client browser 110. In another embodiment, speculative prefetch system 230 may be coupled to client browser 110. Client browser 110 may be coupled to a database 270 that stores information associated with speculative prefetch system 200. Data stored in database 270 may be used to reduce web page load time.

A. Selecting an Item with a Cursor

For ease of explanation, some parts of this disclosure will be described in the context of selecting an item using a cursor. Based on the description herein, a person of ordinary skill in the relevant art will recognize that parts of this disclosure that refer to selecting an item using a cursor are relevant to other embodiments that select an item (e.g., selecting an item via a touch screen device).

A user can interact with a web page by controlling an object in a user interface on a display device and selecting items using the object. In an embodiment, an object that is used to select an item in the web page is a user interface cursor. The user may interact with the web page by moving the cursor over a selectable item in the web page and selecting the item. As used typically herein, a cursor can be controlled by a mouse, trackball, optical mouse, touchpad, or other device, and can be used to manipulate user interface objects.

The user may select an item in various ways using the cursor. For example, the user can select an item by "clicking" on the item (e.g., clicking and releasing a button on a mouse), "double-clicking" on the item, or "right-clicking" on the item and choosing an option from a display menu.

The selectable item may be surrounded by a "hot region" on the web page. A hot region may be a region on the web page that causes a timer to start when the cursor enters the region. Time may elapse between the time a user decides to select the item and the time the user actually selects the item. During this time, the user may position the cursor near the item. Before the user selects the item, the cursor may linger in the region. The duration of time that the cursor is present in the hot region may be measured from the time the cursor enters into the hot region without exiting the hot region. A dwell action occurs when the cursor remains in the hot region for a threshold period of time. A dwell action may indicate a high likelihood that the user will select the selectable item in the near future. According to an embodiment, when a dwell action occurs, an application takes speculative actions on behalf of the user. The speculative actions taken may include all or part of an action that would ensue if the selection were completed.

Figure 3A:
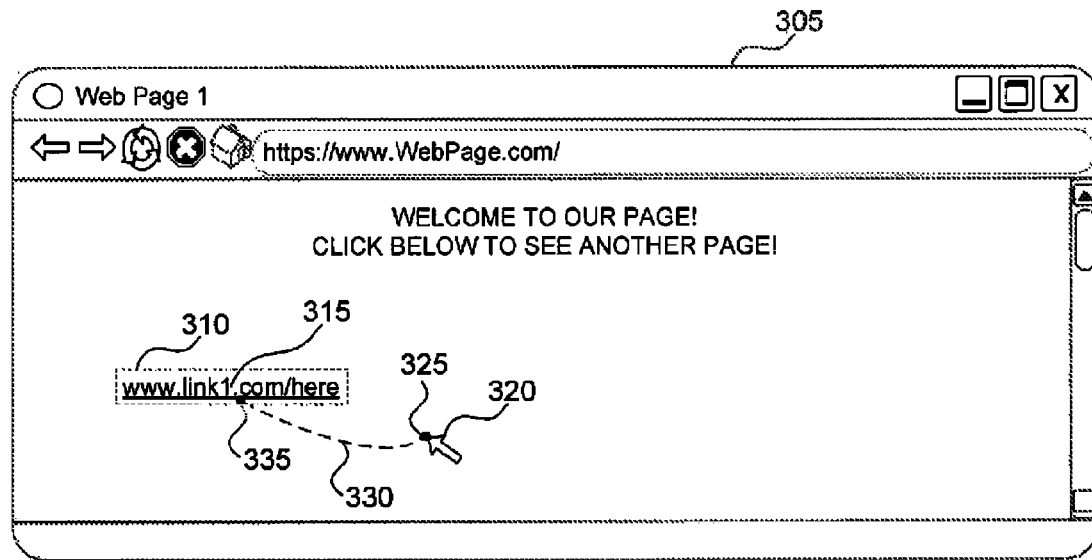
FIG. 3A shows an example web page that includes a region surrounding a selectable item associated with a URL, according to an embodiment.

FIG. 3A shows an example web page 305 that includes a region 310 surrounding a selectable item 315 associated with a URL, according to an embodiment. The URL associated with selectable item 315 is "www.link1.com/here." Selectable item 315 may reference content specified by the URL. Region 310 is a hot region that starts a timer when a cursor 320 enters into region 310.

In an embodiment, object detector 240 detects cursor 320 in region 310 of web page 305. A user can position cursor 320 over selectable item 315 and select it. A cursor position can be an X, Y value that stores the position of the cursor on a user interface at a particular moment in time. A current position 325, as shown in FIG. 3A, of cursor 320 is outside of region 310. This lack of presence inside the hot region may be an indication that the user does not intend to select selectable item 315. Accordingly, a timer does not start counting when cursor 320 is at position 325.

After cursor 320 moves from position 325 along a track 330 to a position 335, cursor 320 is present in region 310. If the user positions cursor 320 in region 310, a probability that the user will select selectable item 315 may increase. According to an embodiment, a timer starts counting as soon as the cursor enters the hot region. The timer may stop counting once the cursor has been present in the region for a threshold period of time. Different speculative actions may be triggered based on different threshold periods of time. In one example, a first speculative action is triggered if cursor 320 has been present in region 310 for a first threshold period of time, and a second speculative action is triggered if cursor 320 has been present in region 310 for a second threshold period of time. If the second threshold period of time is longer than the first threshold period of time, the timer continues counting after the first threshold period of time elapses. In this example, the timer stops counting once the cursor has been present in the region for the second threshold period of time.

Threshold determiner 245 determines whether cursor 320 is present in region 310 for a threshold period of time. If cursor 320 has been present in region 310 for a threshold period of time, a dwell action is deemed to have occurred. An occurrence of a dwell action signals a high probability that the user will select selectable item 315. If a dwell action occurs, threshold determiner 245 may provide an instruction to perform a speculative action. The speculative action is performed with an expectation that the user will request specified content referenced by the selectable item in the near future. The speculative action may include all or at least part of an action that would be performed if the selection were completed.

Speculator 250 performs a speculative action when an instruction to perform a speculative action is provided by threshold determiner 245. In an embodiment, the speculative functionality is provided without modifying underlying code of a web page associated with the URL.

In an embodiment, the speculative action includes performing a Domain Name System (DNS) preresolution. A DNS preresolution may include performing a DNS lookup of the URL hostname before it is certain that the user will select the associated selectable item. A URL includes a hostname and an optional path. A hostname, as referred to herein, means both the DNS resolvable textual name of a host (e.g., www.cnn.com) as well as optionally a port (e.g., port 80, port 443, or port 5000) and a scheme (e.g., HTTP, HTTPS, or FTP). In FIG. 3A, for example, selectable item 315 is associated with URL "www.link1.com/here", which includes a URL hostname "www.link1.com" and a path "/here". Speculator 250 may perform a DNS preresolution of the URL hostname (e.g., "www.link1.com"). The URL hostname may be sent to a DNS server to resolve the URL hostname into an Internet Protocol (IP) address.

In another embodiment, the speculative action includes initiating a preconnection to a URL hostname. Initiating a preconnection may include establishing a connection to the URL hostname, or to the URL hostname plus some or all parts of the URL path or query string, before the connection is required with complete certainty. For example, speculator 250 may initiate a preconnection to a URL hostname. The connection may float in the background until the user actually selects the selectable item.

A secure connection may be established to the URL hostname. In an embodiment, initiating a preconnection includes initiating a secure preconnection. Establishing a secure preconnection to a hostname may include negotiating and establishing a session key. In an embodiment, a secure connection is an SSL connection. Other security protocols can also be used to establish secure connections.

In another embodiment, the speculative action includes precomputing a result of triggering an on-click event in a JavaScript script. The precomputed result may be a completed result or a partial result.

In another embodiment, the speculative action includes prefetching content of a URL. Prefetching content of a URL may include requesting the URL specified content before it is certain to be requested by the user. For example, speculator 250 may prefetch content of the URL. Prefetched content associated with a URL may be preprocessed by renderer 220. Preprocessing may include preparing the content associated with the URL hostname for rendering. Renderer 220 can render or display the prefetched content. For example, when a user requests the content, renderer 220 can render the page and display the page on-screen. Renderer 220 can also render content off-screen and partially preprocess the prefetched content. Renderer 220 may obtain the content, for example, from a cache.

In an embodiment, different speculative actions can be performed based on a time period that the cursor remains in the hot region. An action may be performed based on a degree of confidence that the user will select the selectable item. The longer a cursor remains in a region that surrounds a selectable item, the higher the confidence may be that the user will select the item. Accordingly, more aggressive actions may be taken based on a longer duration of time that the cursor remains in the hot region.

If the cursor remains in the hot region for an extended period of time after a first threshold period of time has elapsed, this may indicate a higher probability that the user will select the item. In one example, if a cursor remains in a hot region for a first threshold period of time, threshold determiner 245 may provide an instruction to perform a DNS preresolution of the URL hostname associated with the selectable item. If the cursor remains in the hot region for a second threshold period of time greater than the first threshold period of time, threshold determiner 245 may provide an instruction to initiate a preconnection to the URL hostname. In one example, threshold determiner 245 initiates a TCP/IP connection to the URL hostname associated with the selectable item.

Figure 3B:
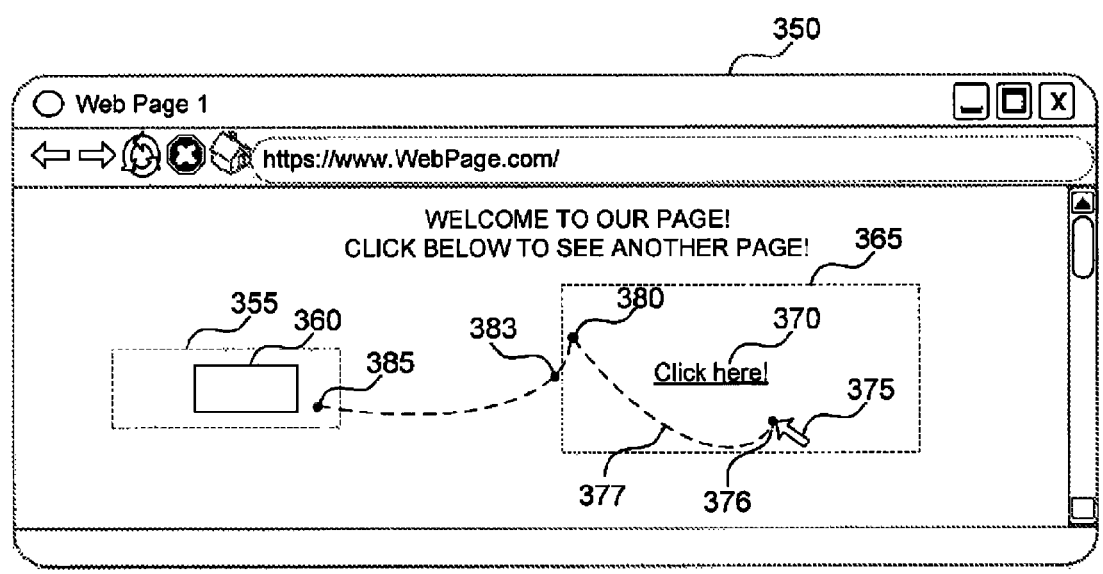
FIG. 3B shows an example web page that includes regions surrounding selectable items associated with URLs, according to an embodiment.

FIG. 3B shows an example web page 350 that includes regions surrounding selectable items associated with URLs, according to an embodiment. A region 355 surrounds a selectable item 360 associated with a first URL. A region 365 surrounds a selectable item 370 associated with a second URL.

A cursor 375 is at a position 376 in region 365. When cursor 375 enters region 365, a timer starts. If cursor 375 stays in region 365 for a threshold period of time, a dwell action is deemed to have occurred. In one implementation, as long as cursor 375 remains in region 365, the timer continues counting. For example, as cursor 375 continues to move along track 377 toward position 380, the timer continues counting. If cursor 375 moves from within region 365 to outside of region 365 before a threshold period of time elapses, a dwell action does not occur. If cursor 375 is subsequently moved to a position that is located in region 365, the timer restarts, for example from zero, and continues to count to a threshold period of time.

If cursor 375 does not stay in region 365 for a threshold period of time, the timer does not continue. For example, if cursor 375 moves from position 380 to position 383, the timer stops counting. If cursor 375 moves along the track from position 383 to position 385, the timer is reset and starts counting. In one embodiment, when cursor 375 leaves a hot region, the time is reset. In another embodiment, when cursor 375 leaves a hot region, the time stops and is reset when the cursor subsequently enters a hot region.

An area of a region that surrounds a selectable item associated with a URL may vary. In one example, an area of a region is hardcoded into the web page. In another example, an area of a region is dynamically determined. For example, an area of the region may be subsequently increased when the user selects the item that the region surrounds. In this example, the area of the region may be increased on subsequent renderings of the selectable item. In FIG. 3B, for example, a user may have previously selected selectable item 370 a greater quantity of times than the user previously selected selectable item 360. Accordingly, an area of region 365 is larger than an area of region 355.

An area of a region may have minimum and maximum values. In an embodiment, an area of a hot region of a web page is smaller than an area of the web page and includes only a single selectable item. For example, in FIG. 3B, an area of region 355 has an area smaller than an area of web page 350. In this embodiment, when a web page is displayed, threshold determiner 245 does not automatically start the timer. Instead, threshold determiner 245 starts the timer when cursor 275 is detected in a hot region. In an embodiment, an area of a region that surrounds a selectable item is approximately equal to an area of the selectable item. In this embodiment, threshold determiner 245 may start the timer when cursor 275 is hovering over the selectable item.

B. Selecting an Item via a Touch Screen Device

A user can also interact with a web page displayed on a display of a touch screen device by selecting an item in the web page. In an embodiment, an object that is used to select an item in the displayed web page is a finger, stylus, capacitive object, or other object that can select items in a web page displayed on a touch screen device. As used typically herein, an object can be used to manipulate user interface objects that are displayed via the touch screen device.

In an embodiment, an object used to select an item is a finger. The user may select an item in various ways using her finger. In one example, the user can select an item by tapping the item at least once. Tapping an item may include touching her finger at a location of the displayed item on the touch screen device and releasing the touch screen. A time period may elapse between touching and releasing the touch screen. In another example, the user can select an item by touching her finger at a location of the displayed item on the touch screen device and leaving her finger at the location.

Figure 4A:
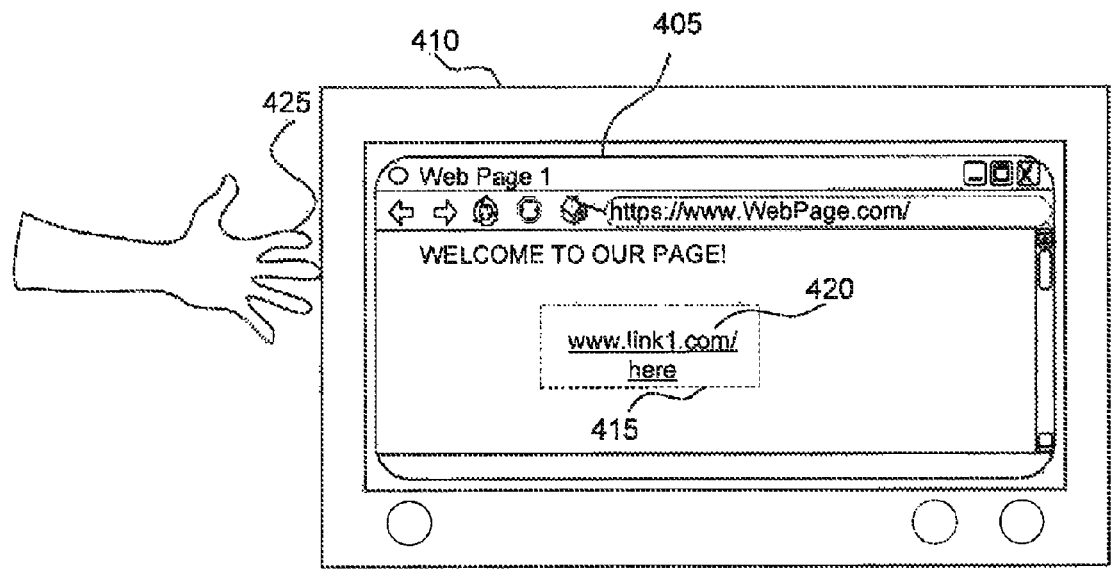
FIG. 4A shows an example web page displayed on a touch screen device, according to an embodiment.

FIG. 4A shows an example web page 405 displayed on a touch screen device 410, according to an embodiment. Web page 405 includes a region 415 that surrounds a selectable item 420 associated with a URL displayed on web page 405. Selectable item 420 references a document located at the URL "www.link1.com/here."

A user may interact with web page 405 by selecting items in the web page. The user can, for example, use her finger 425 to select selectable item 420 by tapping on a location of the screen that displays selectable item 420.

Figure 4B:
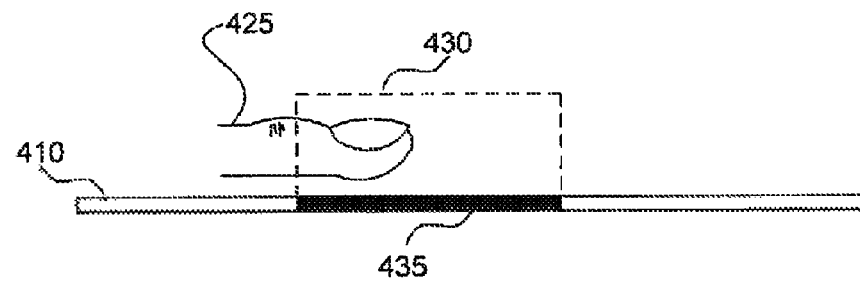
FIG. 4B shows an object located within a proximity above a region of a touch screen device, according to an embodiment.

FIG. 4B shows an object located within a proximity above a region of a touch screen device, according to an embodiment. Region 435 of FIG. 4B corresponds to region 415 of FIG. 4A. Region 435 surrounds a selectable item associated with a URL that is displayed on web page 405. Before the user selects selectable item 420, the user may position her finger above a location on the screen that displays selectable item 420.

Because of the capacitive nature of most touch screens, the touch screen will actually register the presence of an object, such as a finger, before the object physically contacts the touch screen surface. A "hot proximity" may be a proximity above a region that surrounds a selectable item in a web page above the touch screen device that causes a timer to start when an object (e.g., finger or stylus) is within the proximity. Before the user selects the item, the user may hold the object above the region. The duration of time the object is located within the hot proximity may be measured from the time the object enters into the hot proximity without exiting the hot proximity. A dwell action occurs when the object remains within the hot proximity for a threshold period of time. If the object lingers within a proximity above a region of a touch screen device for a threshold period of time, it may be more likely that the user will select the selectable item. As described above, when a dwell action occurs, an application may take speculative actions on behalf of the user.

Object detector 240 detects finger 425 within a proximity 430 above a region 435 of touch screen device 410. Object detector 240 may detect finger 425 before finger 425 touches the screen.

Threshold determiner 245 determines whether finger 425 is located within proximity 430 above region 435 of touch screen device 410 for a threshold period of time. If finger 425 has been located within proximity 430 above region 435 of touch screen device 410 for a threshold period of time, a dwell action is deemed to have occurred. An occurrence of a dwell action signals a high probability the user will select the selectable item. If a dwell action occurs, threshold determiner 245 provides an instruction to perform a speculative action. The speculative action is performed with an expectation that the user will request specified content referenced by the selectable item in the near future. A speculative action may include all or at least part of an action that would be performed if the selection were completed.

Speculator 250 performs a speculative action when an instruction to perform a speculative action is provided by threshold determiner 245. In an embodiment, the speculative functionality is provided without modifying underlying code of a web page associated with the URL.

C. Other Example Embodiments

While system 200 embodied in FIG. 2 shows client browser 110 including object detector 240, threshold determiner 245, and speculator 250, client browser 110 can include more or fewer modules. Additionally, client browser 110 may include a combination of the modules described above.

System 200 may include a communications interface that allows software and data to be transferred between computer system 200 and external devices. Some embodiments may be directed to computer products having software stored on a computer readable storage medium. Such software, when executed in one or more data processing devices, causes a data processing device(s) to operate as described herein.

In an embodiment, object detector 240 contains a camera or other vision detector that detects a point on a screen at which a user is looking. In this embodiment, object detector 240 may detect a user staring at a region of a web page, the region surrounding a selectable item associated with a URL. Threshold determiner 245 may determine whether the user is staring at the region for a threshold period of time. Speculator 250 may perform a speculative action when it is determined that the user has been staring at the region for the threshold period of time. In an embodiment, the speculative functionality is provided without modifying underlying code of a web page associated with the URL.

In another embodiment, system 200 is coupled to a local database that is accessed when a dwell action occurs. For example, a user may select an option such as "edit contact" on her mobile device having a touch screen. Before the user selects the option, object detector 240 may detect the user's finger within a proximity above a region of the touch screen device, the region surrounding the selectable option displayed on the screen. Threshold determiner 245 may determine whether the user's finger is located within the proximity above the region of the touch screen device for a threshold period of time. Before it is certain the user will select the option, a speculative action may be performed. For example, speculator 250 may perform a speculative action when it is determined that the user's finger has been located within the proximity above the region of the touch screen device for the threshold period of time. A speculative action may include reading from memory information that might be needed as a result of the user selecting the option. For example, performing a speculative action may include reading all the contact information from memory that might be needed as a result of the user selecting "edit contacts." A person of ordinary skill in the relevant art will recognize that data different from the described contact information may be stored at the client device, and the user may select other options. Another example of performing speculative actions may include starting or partially starting an application that might be loaded and started if selected by a user.

IV. Threshold Period of Time

Referring to FIG. 2, client device 210 may be coupled to a database 270. Threshold determiner 245 may consult database 270 to determine the threshold period of time. In an embodiment, threshold determiner 245 may store data such as the threshold period of time that a cursor needs to remain in a hot region for a dwell action to occur. In another embodiment, threshold determiner 245 may store data such as the threshold period of time that an object remains within a proximity above a region of a touch screen device before a dwell action is deemed to have occurred.

In an embodiment, the threshold period of time that elapses before a dwell action occurs is greater than zero milliseconds. Timing the dwell time may ensure that an overfly action has not occurred, and may result in an optimal decision to perform a speculative action.

The threshold period of time may be determined at the client device. In an embodiment, threshold determiner 245 determines a threshold period of time that a cursor remains in a hot region before identifying a dwell action. In another embodiment, threshold determiner 245 determines a threshold period of time that an object remains within a proximity above a hot region of a touch screen device before identifying a dwell action.

The threshold period of time may be fixed or based on different factors, in an embodiment, a threshold period of time is static. Examples of static threshold periods of time are 100 milliseconds and 200 milliseconds.

In another embodiment, a threshold period of time is dynamically determined. The threshold period of time may be dynamically modified based on a user's patterns and preferences. Dynamically determining the threshold period of time may increase precision and allow client browser 110 to make an optimal decision regarding whether to perform a speculative action. Further, the chance of false positives may be decreased. In an embodiment, a threshold period of time is dynamically determined based on a user's hover-and-click history, a user's click history, speculative information received from a remote site, or any combination thereof.

In an embodiment, a threshold period of time is based on a user's hover-and-click history. Threshold determiner 245 may monitor a user and observe a time period between the time a user positions a cursor in a hot region and the time the user selects a selectable item. For example, if the user does not typically position the cursor near a selectable item for 200 milliseconds without selecting the item, threshold determiner 245 may set the threshold period of time approximately equal to 200 milliseconds. In this example, when the cursor remains in the hot region for approximately 200 milliseconds, a dwell action is deemed to have occurred and threshold determiner 245 provides an instruction to perform a speculative action. In another example, threshold determiner 245 may observe that the user does not typically position the cursor near a selectable item for 100 milliseconds without selecting the item. Threshold determiner 245 may adjust the threshold period of time accordingly. In one example, threshold determiner 245 takes a weighted average of two periods of time and determines a final threshold period of time.

In another embodiment, a threshold period of time is based on a user's browsing history. Threshold determiner 245 may monitor a user's browsing history (e.g., click history). Threshold determiner 245 may determine from a user's click history whether the user has previously selected an item. If the user's click history indicates that the user has previously selected the item, the threshold period of time may be less than if the user's click history indicates that the user has not previously selected the item.

In one example, referring to FIG. 3B, a user's click history may indicate that the user has previously selected selectable item 360. A threshold period of time that cursor 375 remains in region 355 before a dwell action is identified is a first threshold period of time. The user's click history may indicate that the user has not previously selected selectable item 370. A threshold period of time that cursor 375 remains in region 365 before a dwell action is identified is a second threshold period of time. In this example, the first threshold period of time may be less than the second threshold period of time.

In another embodiment, a threshold period of time is based on speculative information received from a server (e.g., server 120). When a server sends a web page to client browser 110, the web page may include speculative information that threshold determiner 245 uses to determine a threshold period of time.

In one example, speculative information includes a popularity of a link. For example, referring to FIG. 3B, server 120 may send client browser 110 a web page in response to a request. When client browser 110 renders the web page, web page 350 may be displayed to a user. The web page sent to client browser 110 may include a popularity of selectable items 360 and 370. This may be determined by a number of times users have selected the selectable items. A popularity may be a popularity of the selectable item, a popularity of items that are similar to the selectable item, or a combination thereof. In an embodiment, the higher a popularity of a selectable item, the lower a threshold period of time before a dwell action is identified. In this embodiment, a popularity of a selectable item may be an indication of whether the user will select the item. The speculative information may be present in a web page header, web page content, a link tag associated with the URL, or other location.

V. Exemplary Methods

Figure 5:
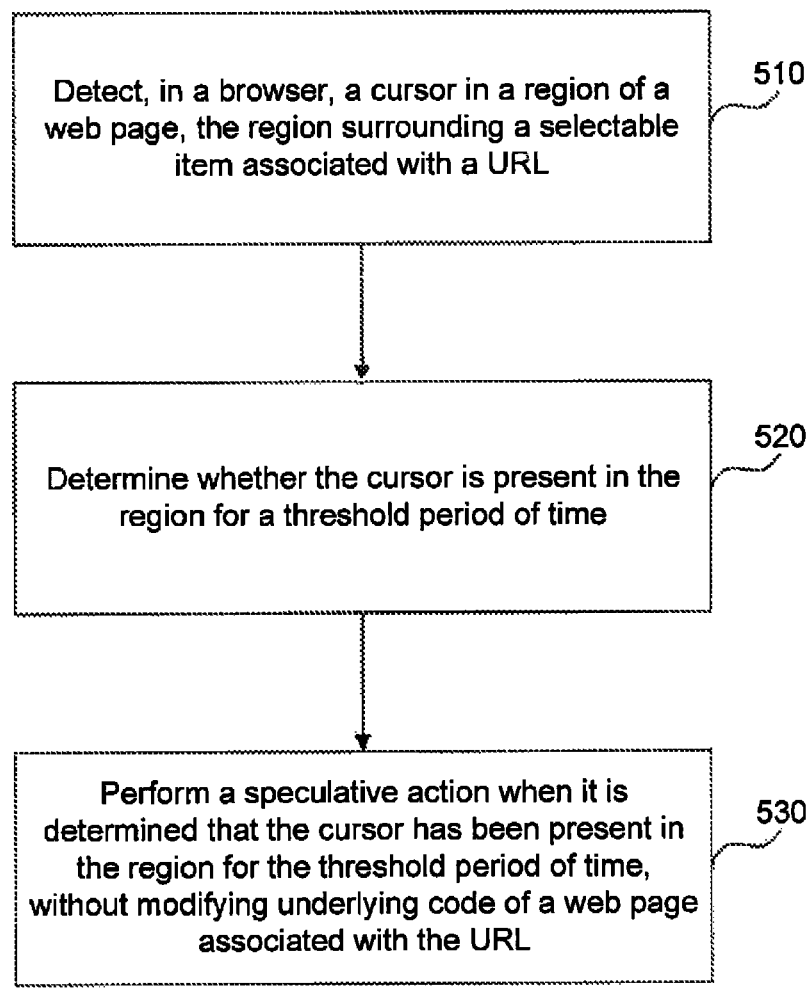
FIG. 5 shows a flowchart of an exemplary method for reducing web page load time based on user dwell time, according to an embodiment.

FIG. 5 shows a flowchart of an exemplary method for reducing web page load time based on user dwell time, according to an embodiment.

At a stage 510, a cursor is detected in a region of a web page, the region surrounding a selectable item associated with a URL. For example, object detector 240 detects a cursor in a region of a web page, the region surrounding a selectable item associated with a URL.

At a stage 520, it is determined whether the cursor is present in the region for a threshold period of time. For example, threshold determiner 245 determines whether the cursor is present in the region for a threshold period of time.

At a stage 530, a speculative action is performed when it is determined that the cursor has been present in the region for the threshold period of time. The speculative action is performed without modifying underlying code of a web page associated with the URL. For example, speculator 250 performs a speculative action when it is determined that the cursor has been present in the region for the threshold period of time, without modifying underlying code of a web page associated with the URL.

Figure 6:
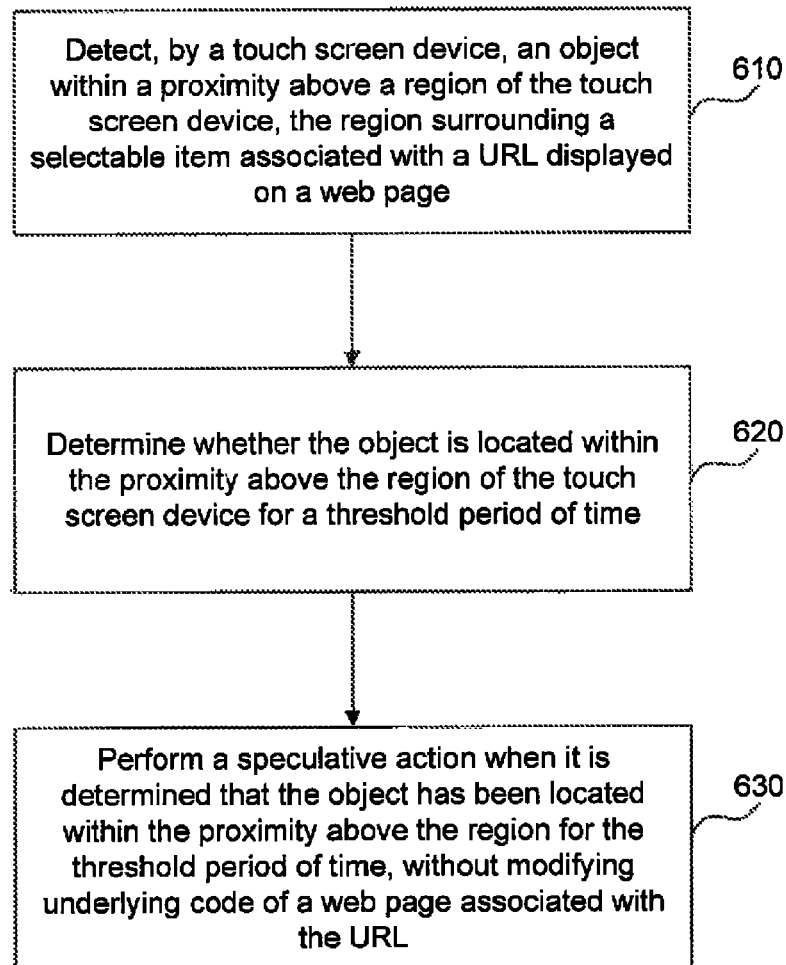
FIG. 6 shows a flowchart of another exemplary method for reducing web page load time based on user dwell time, according to an embodiment.

FIG. 6 shows a flowchart of an exemplary method for reducing web page load time based on user dwell time, according to an embodiment.

At a stage 610, an object is detected, by a touch screen device, within a proximity above a region of the touch screen device, the region surrounding a selectable item associated with a URL displayed on a web page. For example, object detector 240 detects, by a touch screen device, an object within a proximity above a region of the touch screen device, the region surrounding a selectable item associated with a URL displayed on a web page.

At a stage 620, it is determined whether the object is located within the proximity above the region of the touch screen device for a threshold period of time. For example, threshold determiner 245 determines whether the object is located within the proximity above the region of the touch screen device for a threshold period of time At a stage 630, a speculative action is performed when it is determined that the object has been located within the proximity above the region for the threshold period of time. The speculative action is performed without modifying underlying code of a web page associated with the URL. For example, speculator 250 performs a speculative action when it is determined that the object has been located within the proximity above the region for the threshold period of time, without modifying underlying code of a web page associated with the URL.

While methods 500 and 600 are described with reference to system 200, methods 500 and 600 are not meant to be limiting and may be used in other applications.

Stages 510-530 and 610-630 may be performed by renderer 220, object detector 240, speculator 250, and prefetcher 260. In other embodiments, stages 510-530 and 610-630 may be performed by a single module, for example, speculative prefetch system 230 or object detector 240.

VI. Conclusion

The summary and abstract sections may set forth one or more but not all exemplary embodiments as contemplated by the inventor(s), and thus, are not intended to limit the present disclosure and the appended claims in any way.

Some embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Some embodiments, or portions thereof, can be implemented as computer-readable code. For example, some embodiments may be implemented in a computer system using software, firmware, hardware, tangible computer-readable media having instructions stored thereon, or a combination thereof and may be implemented in one or more computer systems or other processing systems. Some embodiments may be implemented as software executing on one or more computing devices. Further, these components can be implemented using a processor (e.g., dual processor or spread across multiple machines). The processor can be connected to a communication infrastructure (for example, a bus or network).

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments.

Exemplary embodiments have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

What is claimed is:

1. A method for reducing web page load time, the method comprising:
   receiving, using one or more computing devices, cursor information regarding an amount of time a cursor is hovering within a region of a web page, the region being associated with a selectable item on the web page;
   identifying, using the one or more computing devices, an adjustable threshold time based on speculative information regarding a browser history associated with a user, the adjustable threshold time indicating a given period of time for the user to select the selectable item;
   determining, using the one or more computing devices, whether the cursor is hovering within the region of the web page for the adjustable threshold time based on the cursor information; and
   when the cursor is determined to be hovering within the region of the web page for the adjustable threshold time, generating, using the one or more computing devices, instructions to perform a first speculative action on a URL associated with the selectable item without modifying underlying code of the web page associated with the URL;
   wherein adjusting the adjustable threshold time is determined dynamically based on the speculative information.

2. The method of claim 1, further comprising selecting the first speculative action from a set of speculative actions comprising at least one of: performing a DNS preresolution of the URL, initiating a first preconnection to the URL, and prefetching a first content of the URL.

3. The method of claim 2, wherein the URL comprises a URL hostname and the instructions to perform the first speculative action include instructions for performing the DNS preresolution of the URL hostname.

4. The method of claim 2, wherein the URL comprises a URL hostname and the instructions to perform the first speculative action include instructions for initiating the first preconnection to the URL hostname.

5. The method of claim 4, wherein the instructions for initiating the first preconnection to the URL hostname comprises instructions for establishing a secure connection to the URL hostname.

6. The method of claim 2, wherein the speculative information includes information regarding a hover-over-click history associated with the user.

7. The method of claim 6, further comprising:
   determining from the hover-over-click history whether the user has previously selected the selectable item; and
   adjusting the adjustable threshold time based on the determination by increasing the given period of time for the user to select the selectable item.

8. The method of claim 7, further comprising:
   determining whether the cursor is hovering within the region of the web page for the adjusted adjustable threshold time;
   when the cursor is determined to be hovering within the region of the web page for the adjusted adjustable threshold time, selecting a second speculative action from the set of speculative actions, the second speculative action is different than the first speculative action, and
   generating instructions to perform the second speculative action on the URL associated with the selectable item without modifying underlying code of the web page associated with the URL.

9. A non-transitory computer-readable storage medium on which computer readable instructions of a program are stored, the instructions, when executed by one or more computing devices, cause the one or more computing devices to perform a method comprising:
   receiving, using the one or more computing devices, cursor information regarding an amount of time a cursor is hovering within a region of a web page, the region being associated with a selectable item on the web page;
   identifying, using the one or more computing devices, an adjustable threshold time based on speculative information regarding a browser history associated with a user, the adjustable threshold time indicating a given period of time for the user to select the selectable item;
   determining, using the one or more computing devices, whether the cursor is hovering within the region of the web page for the adjustable threshold time based on the cursor information; and
   when the cursor is determined to be hovering within the region of the web page for the adjustable threshold time, generating, using the one or more computing devices, instructions to perform a first speculative action on a URL associated with the selectable item without modifying underlying code of the web page associated with the URL;

wherein adjusting the adjustable threshold time is determined dynamically based on the speculative information.

10. The computer-readable storage medium of claim 9, wherein the method further comprises selecting the first speculative action from a set of speculative actions comprising at least one of: performing a DNS preresolution of the URL, initiating a first preconnection to the URL, and prefetching a first content of the URL.

11. The computer-readable storage medium of claim 10, wherein the URL comprises a URL hostname and the instructions to perform the first speculative action include instructions for performing the DNS preresolution of the URL hostname.

12. The computer-readable storage medium of claim 10, wherein the URL comprises a URL hostname and the instructions to perform the first speculative action include instructions for initiating the first preconnection to the URL hostname.

13. A processing system, comprising:
a memory for storing a browser history, and
one or more processors coupled to the memory, the one or more processors being configured to:
receive cursor information regarding an amount of time a cursor is hovering within a region of a web page, the region being associated with a selectable item on the web page;
identify an adjustable threshold time based on speculative information regarding the browser history associated with a user, the adjustable threshold time indicating a given period of time for the user to select the selectable item;
determine whether the cursor is hovering within the region of the web page for the adjustable threshold time based on the cursor information; and
when the cursor is determined to be hovering within the region of the web page for the adjustable threshold time, generate instructions to perform a first speculative action on a URL associated with the selectable item without modifying underlying code of the web page associated with the URL;
wherein adjustment of the adjustable threshold time is determined dynamically based on the speculative information.

14. The system of claim 13, wherein the one or more processors are configured to select the first speculative action from a set of speculative actions comprising at least one of: performing a DNS preresolution of the URL, initiating a first preconnection to the URL, and prefetching a first content of the URL.

15. The system of claim 14, wherein the URL comprises a URL hostname and the instructions to perform the first speculative action include instructions for performing the DNS preresolution of the URL hostname.

16. The system of claim 14, wherein the URL comprises a URL hostname and the instructions to perform the first speculative action include instructions for initiating the first preconnection to the URL hostname.

17. The system of claim 16, wherein the instructions for initiating the first preconnection to the URL hostname comprises instructions for establishing a secure connection to the URL hostname.

18. The system of claim 17, wherein the speculative information includes information regarding a hover-over-click history associated with the user.

19. The system of claim 18, wherein the one or more processors are further configured to:
determine from the hover-over-click history whether the user has previously selected the selectable item; and
adjust the adjustable threshold time based on the determination by increasing the given period of time for the user to select the selectable item.

20. The system of claim 19, wherein the one or more processors are further configured to:
determine whether the cursor is hovering within the region of the web page for the adjusted adjustable threshold time;
when the cursor is determined to be hovering within the region of the web page for the adjusted adjustable threshold time, select a second speculative action from the set of speculative actions, the second speculative action is different than the first speculative action, and
generate instructions to perform the second speculative action on the URL associated with the selectable item without modifying underlying code of the web page associated with the URL.

* * * * *